United States Patent Office 3,202,430
Patented Aug. 24, 1965

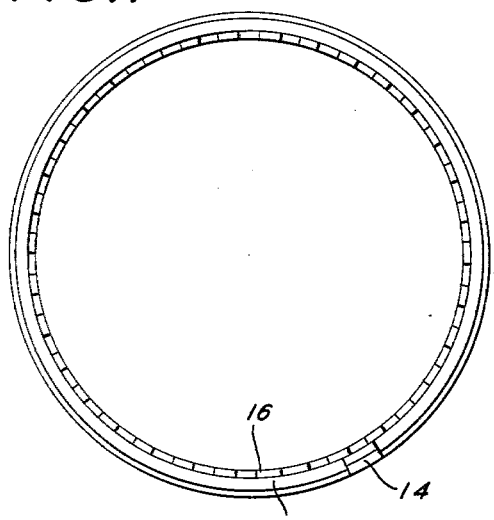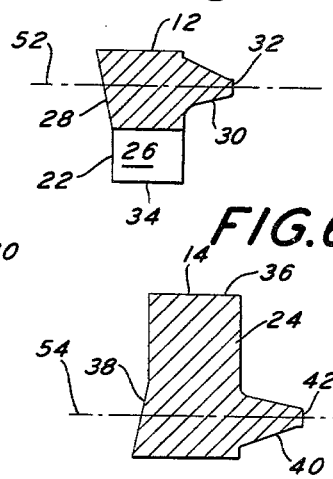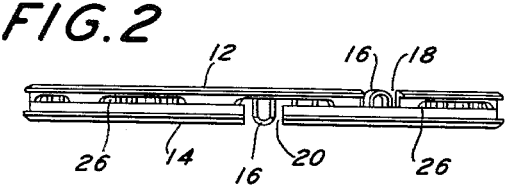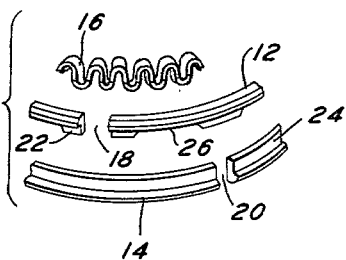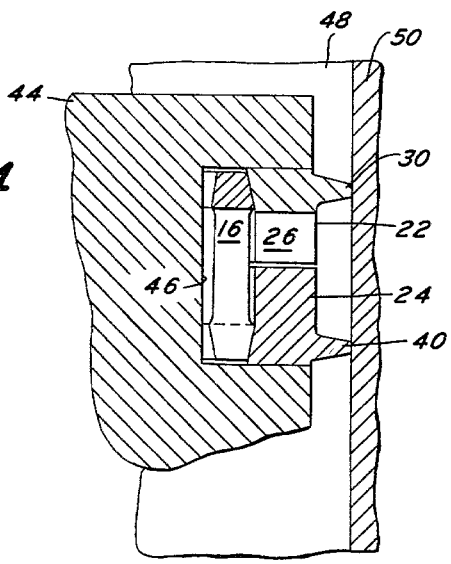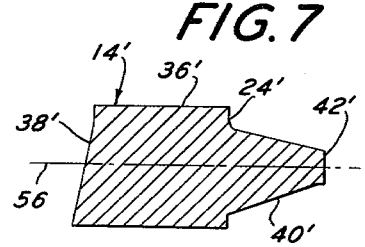

3,202,430
PISTON RING ASSEMBLY
Helmuth Gunther Braendel, Malvern, Pa., assignor to Wilkening Manufacturing Co., Philadelphia, Pa., a corporation of Delaware
Filed June 25, 1962, Ser. No. 204,964
2 Claims. (Cl. 277—79)

This invention relates to a piston ring assembly.

The piston ring assembly of the present invention is primarily designed so as to have increased side stability and side loading. The piston ring assembly of the present invention is particularly useful in trucks or other heavy duty vehicles and is designed so as to have a life span of 150,000 miles before requiring a replacement therefor.

The piston ring assembly of the present invention is structurally interrelated in a manner so as to have a side loading while at the same time prevents canting or cocking of the cylinder contacting elements. Wide wall engaging surfaces and equalizer engaging surfaces are provided so as to eliminate fluttering, squealing, and provide longer life. Many piston ring assemblies have been designed heretofore so as to provide a windshield wiper effect of the cylinder contacting surfaces since the same results in a better seal between the ring assembly and the wall of the cylinder bore. However, rails which are designed to operate in this manner are subject to high wear. Since the present invention is particularly designed so as to provide a longer life span, fluttering or windshield wiping action of rails is considered to be undesirable.

In order to have increased stability, the piston ring assembly of the present invention includes upper and lower rails in intimate contact over a wide surface area. The upper and lower rails each have a broad surface area adapted to contact the walls of the piston ring groove. The equalizer is preferably designed so that it does not contact the walls of the piston ring groove.

It is an object of the present invention to provide a piston ring assembly structurally interrelated in a manner so as to provide for increased life span.

It is another object of the present invention to provide a novel piston ring assembly having improved side stability and side loading and lacking fluttering or squealing.

It is another object of the present invention to provide a piston ring assembly structurally interrelated in a manner so that the upper and lower rails are not subject to fluttering.

It is another object of the present invention to provide a piston ring assembly which may be guaranteed for 100,000 miles or more.

Other objects will appear hereinafter.

For the purpose of illustrating the invention there is shown in the drawing forms which are presently preferred; it being understood, however, that this invention is not limited to the precise arrangements and instrumentalities shown.

FIGURE 1 is a top plan view of a piston ring assembly in accordance with the present invention.

FIGURE 2 is a side elevation view of the piston ring assembly illustrated in FIGURE 1.

FIGURE 3 is a partial exploded view of the piston ring assembly in FIGURES 1 and 2.

FIGURE 4 is a partial sectional view of a cylinder bore and piston incorporating the piston ring assembly of the present invention.

FIGURE 5 is an enlarged sectional view of the top rail.

FIGURE 6 is an enlarged sectional view of the bottom rail.

FIGURE 7 is an enlarged sectional view of an alternative bottom rail.

Referring to the drawings in detail, wherein like numerals indicate like elements, there is shown in FIGURE 1 a piston ring assembly designated generally as 10.

The piston ring assembly 10 comprises an upper rail 12 spaced from a lower rail 14, with such rails being biased radially outwardly by an equalizer 16. As shown more clearly in FIGURE 1, the entire equalizer 16 is radially inwardly of the rails 12 and 14.

The upper rail 12 is provided with a free gap 18. The lower rail 14 is provided with a free gap 20. The upper rail 12 is provided with a body portion 22, and the lower rail 14 is provided with a body portion 24. The body portion 22 of the upper rail 12 is provided with a plurality of slots or notches 26 at spaced points therealong which constitute oil flow passages.

As shown more clearly in FIGURE 5, the upper rail 12 is provided with an angled surface 28 converging in a radially outwardly direction from the uppermost surface thereof to the notch 26. The surface 28 extends around the entire inner surface of the upper rail 12. The outer surface of the upper rail 12 remote from the angled surface 28 is provided with a radially outwardly directed wall engaging projection 30. The projection 30 has a cross section simulating a truncated triangle and terminates in an end face 32. The end face 32 is preferably provided with a chrome plating having a thickness between .004 and .010 inch.

The bottom surface 34 of the top rail 12 is adapted to be slightly spaced from the top surface 36 of the lower rail 14. The lower rail 14 is provided with an angled surface 38 corresponding with angled surface 28. The lower rail 14 is provided with a wall engaging projection 40 having a cross section simulating a truncated triangle. The projection 40 terminates in an end face 42. The end face 42 is provided with a chrome plating in the manner described above. It will be noted that each of the end faces 32 and 42 have a substantial wall engaging surface extending in an axial direction as compared with the various types of piston ring assembly rails proposed heretofore which terminate in a nose or sharp point which is conducive to fluttering.

The piston ring assembly 10 is adapted to be mounted in a peripheral groove 46 on the outer periphery of piston 44. The piston 44 is adapted to reciprocate in the bore 48 of cylinder 50. As illustrated more clearly in FIGURE 4, the undulations of the equalizer 16 are angled for mating contact with the angled surfaces 28 and 38. The substantial mating surface engagement between the equalizer 16 and the rails 12 and 14 provides even side loading and eliminates fluttering. The end faces 32 and 42 are in the nature of substantial wall engaging surfaces extending in an axial direction to assist in preventing fluttering.

When disposed within the groove 46, the surfaces 34 and 36 of the rails 12 and 14 are slightly spaced from each other. The top surface on the rail 12 and the bottom surface on the rail 14 are in intimate contact with the juxtaposed walls defining the groove 46. The equalizer 16 is dimensioned so that it does not engage, except incidentally, the upper and lower surfaces defining the groove 46. When the piston ring assembly 10 is assembled and mounted in the piston 44 as illustrated in FIGURE 4, the equalizer 16 imparts to the rails 12 and 14 a radially outwardly directed pressure between 150 and 250 pounds per square inch.

The equalizer 16 is preferably made from a spring-type metal. A variety of metals suitable for use as an equalizer are commercially available. Except for the chrome plating on the projections of the rails, the rails 12 and 14 may be made of cast iron. The angled surfaces 28 and 38 preferably form an angle of approximately 12° with the vertical.

In FIGURE 7, there is disclosed an alternative embodiment for the lower rail and designated generally as 14'. The lower rail 14' is identical with the lower rail 14 except for the height of the body portion 24'. The body portion 24' is smaller in height than the body portion 24. Hence, the height of the piston ring assembly in an axial direction may be varied by varying the height of the body portion of the lower rail. When the lower rail 14' is utilized in a piston ring assembly, the equalizer will be proportioned so that the distance between the extremities of adjacent undulations is proportionately decreased. As a result thereof, the upper rail 12 may be utilized with any one of a variety of lower rails to attain piston ring assemblies of varying height in an axial direction.

As shown more clearly in FIGURE 5, a horizontally disposed line 52 bisects the end face 32 and the angled surface 28. However, the extent of the angled surface 28 is substantially greater than the extent of the end face 32 in an axial direction. This same relationship exists between the angled surface 38, end face 42, and the horizontal line 54 as well as the angled surface 38', end face 42' and horizontal line 56. These relationships improve the side loading and stability of the piston ring assembly 10.

With reference to rails 12 and 14 as set forth above and hereinafter, the terms "upper" and "lower" are used for convenience. Since the assembly has not been specifically designed so that rail 12 be above rail 14, the assembly may be installed with rail 12 being below rail 14.

The present invention may be embodied in other specific forms without departing from the spirit or essential attributes thereof and, accordingly, reference should be made to the appended claims, rather than to the foregoing specification as indicating the scope of the invention.

I claim:

1. A piston ring assembly comprising an annular upper rail, an annular lower rail, said rails having surfaces for establishing intimate contact with the sides of a piston groove, each rail having a radailly outwardly extending projection terminating in a wall engaging end face of substantial width parallel to the longitudinal axis of said rails, an undulated equalizer juxtaposed to and radially inwardly of said rails, an angled surface on the inner periphery of said rails, substantially the entire angled surfaces on the undulations of said equalizer mating only with the angled surface of said rails, said equalizer biasing said rails radially outwardly and being the sole means for establishing intimate rail contact with the sides of a piston groove, said wall-engaging end face and said angled surface of each rail being substantially bisected in cross section by an imaginary radially directed line.

2. A piston ring assembly in accordance with claim 1 including means on one of said rails, for providing a passage through which oil may flow.

References Cited by the Examiner
UNITED STATES PATENTS
FOREIGN PATENTS

| | | | |
|---|---|---|---|
| 1,708,816 | 4/29 | Williams | 277—143 |
| 1,798,458 | 3/31 | Deputy | 277—79 |
| 1,860,025 | 5/32 | Good | 277—143 |
| 2,965,423 | 12/60 | Braendel | 277—141 |
| 3,066,943 | 12/62 | Brenneke | 277—143 |

LEWIS J. LENNY, *Primary Examiner.*

SAMUEL ROTHBERG, EDWARD V. BENHAM, *Examiners.*